United States Patent
Igarashi et al.

(10) Patent No.: US 6,638,171 B1
(45) Date of Patent: Oct. 28, 2003

(54) STORY GENERATING GAME SYSTEM USING PARTIAL PROGRAMS WITH DIFFERENT ENDINGS

(75) Inventors: Koji Igarashi, Tokyo (JP); Masahiko Saito, Tokyo (JP)

(73) Assignees: Konami Corporation, Tokyo (JP); Konami Computer Entertainment Tokyo Inc., Tokyo (JP)

( * ) Notice: Subject to any disclaimer, the term of this patent is extended or adjusted under 35 U.S.C. 154(b) by 79 days.

(21) Appl. No.: 09/676,563

(22) Filed: Oct. 2, 2000

(30) Foreign Application Priority Data

Sep. 30, 1999 (JP) ............................................ 11-280791

(51) Int. Cl.⁷ ................................................. A63F 13/00
(52) U.S. Cl. ............................................ 463/43; 463/31
(58) Field of Search ............................... 463/1, 30, 31, 463/36, 42, 43; 386/95, 125

(56) References Cited

U.S. PATENT DOCUMENTS

| | | | |
|---|---|---|---|
| 4,884,972 A | * 12/1989 | Gasper | 434/185 |
| 5,393,073 A | * 2/1995 | Best | 463/35 |
| 5,805,784 A | * 9/1998 | Crawford | 395/173 |
| 5,907,658 A | * 5/1999 | Murase et al. | 386/95 |
| 6,067,400 A | * 5/2000 | Saeki et al. | 386/95 |
| 6,106,399 A | * 8/2000 | Baker et al. | 463/42 |
| 6,126,544 A | * 10/2000 | Kojima | 273/236 |
| 6,168,524 B1 | * 1/2001 | Aoki et al. | 463/31 |

FOREIGN PATENT DOCUMENTS

| | | | |
|---|---|---|---|
| JP | 08-141215 | * | 6/1996 |
| JP | 11-33234 A | | 2/1999 |
| JP | 11-57219 A | | 3/1999 |
| JP | 11-114227 A | | 4/1999 |

OTHER PUBLICATIONS

Final Fantasy VII Kaitai Shinsho, "Corel Reactor Battle", pp. 172–175.
Final Fantasy VII Kaitai Shinsho, "Fort Condor Battle", pp. 172–175.
Final Fantasy VII Kaitai Shinsho, "Underwater Battle", pp. 172–175.

* cited by examiner

Primary Examiner—John M Hotaling, II
(74) Attorney, Agent, or Firm—Sughrue Mion, PLLC (57) ABSTRACT

In a game program production method which can create game programs, a plurality of different partial scenarios different from one another are prepared and one story is formed by successively linking partial scenarios from first to fourth ones selected substantially randomly from the partial scenarios by the use of pseudo-random numbers. Thus, a wide variety of stories can be written in this way by combining many and various partial scenarios. Thus, the method is realized by a game system and a recording medium with which players can enjoy games that are rich in variety.

11 Claims, 6 Drawing Sheets

FIG. 1

| | | |
|---|---|---|
| (1) | ABDUCTION SCENARIO | E1 |
| (2) | CURSE SCENARIO | E2 |
| (3) | ILLNESS SCENARIO | E3 |
| (4) | GUARDED ESCORT SCENARIO | E4 |
| (5) | MISSION SCENARIO | E5 |
| (6) | SUBJUGATION SCENARIO | E6 |
| (7) | 1ST SEARCH SCENARIO | E7 |
| (8) | 2ND SEARCH SCENARIO | E8 |
| (9) | ESCAPE SCENARIO | E9 |
| (10) | INFORMATION SCENARIO | E10 |

STORY GENERATING GAME SYSTEM USING PARTIAL PROGRAMS WITH DIFFERENT ENDINGS

BACKGROUND OF THE INVENTION

1. Field of the Invention

The present invention relates to a game program production method, a game system, and a recording medium used in role playing games.

2. Description of the Related Art

Recently, proposals have been made about many and various game systems and also made about a wide variety of video or television games used in these game systems. For example, such games include simulation games, role playing games, fighting games, and puzzle games.

Among these games, the role playing games are such that the player becomes the main character in the game and has various experiences within the game space along the lines of the story set up within the program. It is a recent trend that such role playing games tend to become more complex and longer as the game systems become more advanced. Accordingly, some role playing games require up to 50 hours from start to finish. In such long role playing games, usually all data up to the stage reached by a player is stored in a memory card that can be attached to or detached from the game system. When the player plays a next time, the game can be continued and be progressive to the next stage by reading the data from the memory card attached to the game system.

Herein, it is to be noted that players playing a long role playing game do not always necessarily want to play the game continuously. Sometimes, a player may neither want to play such a game nor may play the game for a long period of time. When a situation continues such that a game has been interrupted on the way of the game or is not used for a long time, a player may sometimes lose interest in the game.

On the other hand, a player's interest even in a long role playing game tends to weaken once the game is cleared or comes to an end. Therefore, consumers are always expecting role playing games to have more variations and are wanting games that they do not tire of.

To the contrary, it is very laborious and time consuming for software developers developing role playing games to develop long role playing games. This trend is becoming more pronounced as game systems become more advanced.

SUMMARY OF THE INVENTION

It is an object of the present invention to provide a game program production method for producing programs for games with substantial variation that can maintain a player's interest over a long period of time.

It is another object of the present invention to provide a game program production method that can reduce the labor and time imposed on software developers and furthermore that can create games with a wide variety of the scenarios provided.

It is a further object of the present invention to provide a game system that can be finished in a relatively short period of time, that can enjoy each game with substantial variation as a single game unit, and that can readily lengthen games by combining a plurality of single game units.

It is a still further object of the present invention to provide a recording medium for storing programs for the above games.

A method to which the present invention is applicable is for use in producing a game program that executes a game in accordance with a story. According to a first aspect of the present invention, the method comprises the steps of preparing a plurality of partial programs for partial scenarios each equipped with end conditions, selecting a first one of the partial programs that has a first one of the end conditions, and determining, from the partial programs, a second one of the partial programs that has a second one of the partial programs in accordance with the first end condition of the first partial program, on the condition that the second partial program continues with the first partial program in the story. In this way, the partial programs for partial scenarios are combined to create the story.

Thus, in the game program production method according to the present invention, combinations of programs, namely, partial programs for partial scenarios can be used to create games with abundant variety.

Therefore, combining partial scenarios programs with one another in a substantially random manner can create various different stories and, players can thus enjoy the game as played along each story line.

According to another aspect of the present invention, a game system is capable of executing a game in accordance with a story and player operations. The game system comprises storage means for storing a plurality of partial programs for partial scenarios that partially define the story and that are each equipped with end conditions and scenario processing means, operable in response to the player operation, for determining a first one of the partial programs for the first partial scenario that makes up a first part of the story, and for selectively determining a second one of the partial programs for the second stage partial scenario, that follows the first partial program for the first stage partial scenario, so that the story continues from the end condition of the first partial program for the first partial scenario. The first and the second partial programs for the first and the second partial scenario are combined to create the story.

A computer-readable recording medium according to still another aspect of the present invention is for use in executing a game according to a story and player operations. The recording medium comprises the steps of determining a first one of partial programs for the first partial scenario that executes a first part of the story in accordance with the player operations by selecting a plurality of partial programs for partial scenarios that execute parts of the story and that are each equipped with end conditions and selectively determining, among the plurality of the partial programs for the partial scenarios, a second one of the partial programs for the second partial scenario that follows the first partial program for the first stage partial scenario with reference to the end condition of the first partial program for the first partial scenario on the condition that the second partial program can continue the story from the end condition of the first partial program for the first partial scenario. The story is composed of a combination of the partial programs for partial scenarios.

Using such a recording medium can enjoy various games with different stories by managing programs for a plurality of partial scenarios.

DESCRIPTION OF THE PREFERRED EMBODIMENTS

Figure 1:
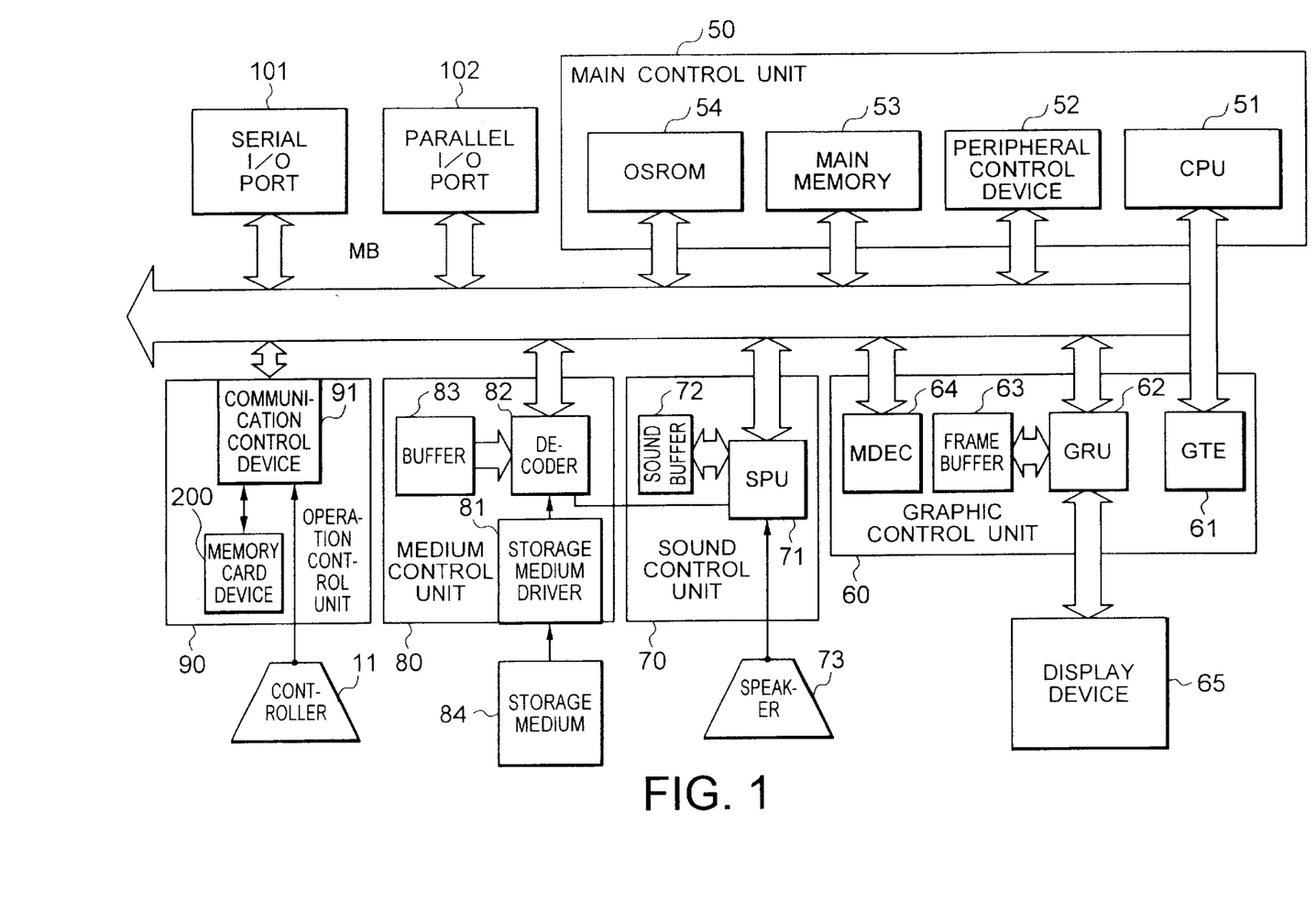
FIG. 1 is a block diagram showing a game device in which the present invention can be applied.

Referring to FIG. 1, description is made about a game device to which the present invention is applicable. Although the illustrated game device is a home video game device, the present invention can be applied to a personal computer, a graphic computer, an arcade game machine, or the like.

First, a recording medium or a storage medium 84, such as an optical disk (CD-ROM or other disk-shaped recording medium) is loaded into the game device to play a game. The optical disk in this embodiment is assumed to store thereon a program according to the present invention.

More particularly, the game device comprises a main control unit 50, a graphic control unit 60, an audio control unit 70, a medium control unit 80, and a communication control unit 90, as shown in FIG. 1. These control units 50 to 90 may be collectively called a control block. The control units 50 to 90, that is, those constituting the control block, are all connected to a main bus MB. In the illustrated example, a parallel I/O port 101 for connecting other peripheral equipment and a serial I/O port 102 for communicating with other game apparatuses and the like are connected to the main bus MB. The main control unit 50, control input control unit 90, and medium control unit 80 operate as game control units for controlling the execution of the game in response to player control operation carried out by manipulating the controller 11 that operates as a control input unit.

The illustrate main control unit 50 is configured by a central processing unit (CPU) 51, a peripheral device controller 52, a main memory 53, and an operating system (OS) ROM 54. More specifically, the peripheral device controller 52 in the main control unit 50 performs interrupt control, timing control, memory control, and control over direct memory access (DMA) transfers, etc. On the other hand, the main memory 53 is configured by an RAM of a memory capacity of 2 megabytes, for example, while the OS ROM 54 is configured by a 512-kilobyte memory, for example. The OSROM 54 stores programs for the so-called operating system or the like which manages the main memory 53, the graphic control unit 60 (operable as a graphic system), and the audio control unit 70 (operable as a sound system), etc., as mentioned before.

The illustrated CPU 51 is formed by a 32-bit RISC (reduced instruction set computer) CPU and is operable to control overall devices by executing the operating system (OS) stored in the ROM 54. The illustrated CPU 51 also has a command cache and a scratch pad memory and also manages a real memory.

The graphic control unit 60 is configured by a geometry transfer engine (GTE) 61, a graphic processing unit (GPU) 62, a frame buffer 63, and an expansion circuit 64. The display device 65 is connected to the GPU 62 in the graphic control unit 60. In this case, the graphic control unit 60 operates as a display control unit to control the display on a screen of the display device 65.

The display device 65 noted here may be a television receiver in the case of an ordinary home game machine, a computer display in the case of a personal computer or work station, and a game display device in the case of a commercial game machine.

The geometry transfer engine (GTE) 61 in the graphic system 60 described before is configured by a coordinate computing coprocessor that performs coordinate conversions and other processing. The graphic processing unit (GPU) 62, on the other hand, performs image drawing in accordance with drawing instructions (drawing commands) from the CPU 51. The images drawn by this GPU 62 are stored in the one-megabyte frame buffer 63, for example. The expansion circuit 64 performs direct conversions, such as so-called discrete cosine transforms, and also is configured by an image decoder (hereinafter called an MDEC) 64 that decodes image data compressed and encoded.

The geometry transfer engine (GTE) 61 comprises, for example, a parallel processing mechanism that executes a plurality of computations in parallel. The GTE 61 is operable as the coprocessor of the CPU 51 and carries out, in response to processing requests from that CPU 51, conversion, such as coordinate conversion, light source computations based on computations of the inner products of normal vectors and light source vectors. For example, fixed decimal point type matrix and vector computations can be carried out at high speed by the illustrated GTE 61.

More specifically, in cases where computations are done to implement flat shading that draws one triangular polygon in the same color, coordinate computations of around 1,500,000 polygons can be performed per second at maximum by the illustrated GTE 61. With this structure, the illustrated image processing system not only can reduce the loads on the CPU 51, but also can execute high-speed coordinate computations. It is to be noted that the polygon means a minimum graphical unit for displaying three-dimensional objects and may be a triangle or quadrangle. In the present invention, as will be described subsequently, coordinate computations are performed for each polygon using the GTE 61.

The graphic processing unit (GPU) 62 operates according to polygon drawing commands from the CPU 51, and performs the drawing of polygons for the frame buffer 63. This GPU 62 is designed to draw up to 360,000 polygons in 1 second. This GPU 62, furthermore, has its own two-dimensional address space that is independent of the CPU 51, configured so that the frame buffer 63 maps thereto.

The frame buffer 63 is formed by a so-called dual port RAM, and is capable of simultaneously performing both drawing operation indicated from the GPU 62 or transfer operation indicated from the main memory 53, and read-out operation for the displays. More specifically, the frame buffer 63 has 1 megabyte of memory capacity, for example, and is handled, respectively, as 16-bit matrixes with 1024 pixels arranged in the horizontal direction and 512 pixels arranged in the vertical direction.

This frame buffer 63 can output any display area of the stored image display areas on the display device 65. In addition to the display areas for video signals, the frame buffer 63 also comprises a CLUT area for storing a color look-up table (CLUT) that is referenced when the GPU 62 draws polygons and the like, and a texture area for storing materials (textures) inserted (mapped) into the polygons that are coordinate-converted at drawing time and drawn by the GPU 62.

The illustrated frame buffer 63 is also capable of performing high-speed DMA transfers with the main memory 53.

The expansion circuit (MDEC) 64 in the graphic control unit 60, meanwhile, reads data from the recording medium 84 under the control of the CPU 51, decodes still picture or moving picture image data stored in the main memory 53, and again stores those data in the main memory 53. More specifically, the MDEC 64 is designed so that it can execute reverse discrete cosine transform (reverse DCT) computations at high speed. As a result, the MDEC 64 can expand compressed data read out from the recording medium 84, according to the procedures of the color still picture compression standard (so-called JPEG) or accumulated media type moving picture encoding standard (so-called MPEG).

These reproduced image data are stored in the frame buffer 63 after they are passed through the GPU 62, and thereby can be used as background for the images drawn by the GPU 62 described earlier.

The audio control unit, that is, the sound system 70, comprises a sound playback processor (SPU) 71 for generating musical sounds and sound effects, etc., based on instructions from the CPU 51, a 512-byte sound buffer 72, for example, wherein are stored voice or musical data, etc., or sound source data, etc., read out from the CD-ROM, and a speaker 73 that serves as sound output means for outputting the musical sounds and sound effects, etc., generated by the SPU 71.

The SPU 71 described above is provided with ADPCM decoding functions for reproducing audio data that have been adaptive differential encoded (ADPCM [Adaptive Differential Pulse Code Modulation]), with 16-bit audio data as 4-bit differential signals, with playback functions for playing back sound effects and the like by playing back sound source data stored in the sound buffer 72, and with modulation functions for modulating and playing back the audio data, etc., stored in the sound buffer 72.

As mentioned before, it is readily understood that the SPU 71 at issue has a built-in ADPCM sound source 24 which has functions for looping automatic modification of motion parameters having time as a coefficient, and operates according to control inputs sent from the CPU 51. The SPU 71 also manages its own address space wherein the sound buffer 72 is mapped, transfers ADPCM data from the CPU 51 to the sound buffer 72, and plays back data by directly passing key-on, key-off, and modulation information.

The sound system 70 can be used as a so-called sampling sound source that plays back musical sounds and sound effects based on audio data, etc., stored in the sound buffer 72 according to instructions from the CPU 51.

Next, the medium control unit 80 is configured by a recording medium driver 81, a decoder 82, and a buffer 83, and the recording medium 84 is loaded into the recording medium driver 81. For the recording medium 84 here, a hard disk, a flexible disk, a semiconductor memory or the like can be used, although description is restricted to the optical disk, that is, the CD-ROM, as mentioned before. In this connection, it is readily understood in FIG. 1 that the recording medium driver 81 is a CD-ROM driver and the decoder 82 is a CD-ROM decoder. The game program according to the present invention is stored in this recording medium 84.

The recording medium driver 81 described above has functions for playing back programs and data, etc., recorded on the recording medium 84 that is, the CD-ROM disk, while the decoder 82 is provided with functions for decoding programs and data, etc., that are stored after an error correction code (ECC) is added. The buffer 83, furthermore, is configured by a RAM having 32 kilobytes of recording capacity, for example, for temporarily storing playback data from the recording medium driver 81.

Provision is made here such that, in terms of disk format, CD-DA or CD-ROM XA data, etc., can be supported, and the decoder 82 also operates as a part of the audio control unit 70 for playing back audio data recorded on the recording medium 84.

The audio data recorded on the disk played back by the illustrated recording medium driver 81 may be, in addition to ADPCM data (CD-ROM XA ADPCM data, etc.), so-called PCM data resulting from the analog/digital conversion of audio signals.

Of the audio data noted in the foregoing, ADPCM data are recorded with the differential of 16-bit data represented with 4 bits, and those ADPCM data are supplied to the SPU 71 described earlier after being subjected to error correction and decoding by the decoder 82. The data undergoes digital/analog conversion and other processing in the SPU 71 and are then sent to the speaker 73.

Meanwhile, the audio data formed by PCM data recorded as 16-bit digital data, for example, is decoded by the decoder 82 and then used for driving the speaker 73. The audio output from that decoder 82 first goes to the SPU 71 where it is mixed with the output of that SPU, then passed through a reverb unit to form the final audio output.

Now, the present invention provides the recording medium 84 for storing a game program playable on the game device shown in FIG. 1 and a game system that includes this recording medium 84. In addition, the present invention provides a method for producing the game programs that are executed on the game device of FIG. 1.

Figure 2:
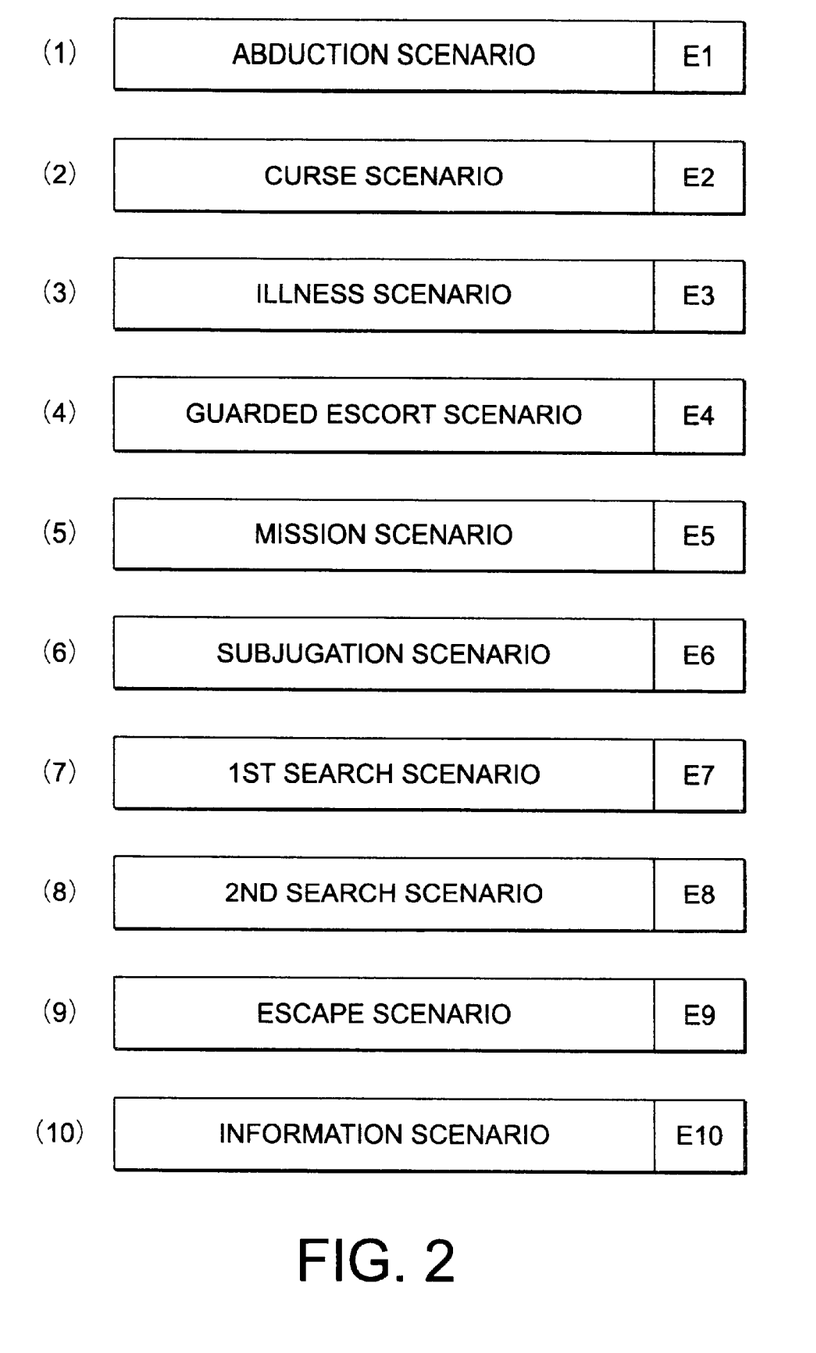
FIG. 2 presents an overview for explaining the method for producing games that relate to the present invention.

Here, the concept of the method for producing the game programs that relate to the present invention will be explained with reference to FIG. 2. At first, a plurality of scenarios, each with a different aim, is produced or written and prepared. In the example shown in FIG. 2, ten scenarios are prepared. The illustrated ten scenarios include an abduction scenario (1), a curse scenario (2), an illness scenario (3), a guarded escort scenario (4), a mission scenario (5), a subjugation scenario (6), two search scenarios (7) and (8), an escape scenario (9), and an information scenario (10). Specifically, because in the present invention these scenarios are used to create part of the story, they are generally called partial scenarios. These partial scenarios are realized in the form of programs for partial scenarios and each partial scenario includes many short stories that can be selected by players. Here, it is assumed that four partial scenarios form one story.

Specifically, the aim of the abduction scenario (1) is that the main character in the game (that is, the player) rescues, from the abductor, the person who has been abducted in the game. The aim of the curse scenario (2) is that the person who has been cursed is released from the curse by the deeds of the main character. The aim of the illness scenario (3) is that the cause of the illness in the person or persons who have become ill is cured by deeds of the main character. In the guarded escort scenario (4), a predetermined person is escorted by the main character to a prescribed place.

The aim of the mission scenario (5) is that the main character hands over a requested item to a certain person and the aim of the subjugation scenario (6) is that a targeted monster is subdued or suppressed by the main character.

The aim of the one of the two search scenarios (7) is that the main character finds an item (hereinafter called the first search scenario). On the other hand, the aim of the other (8) is that the main character finds a person and takes that person to have him or her meet the requesting party (hereinafter called the second search scenario).

The aim of the escape scenario (9) is that the main character escapes from a certain area in the game space to another area. The aim of the information scenario (10) is that the main character seeks all the information necessary for the next activity.

All of the partial scenarios above might appear, at a glance, to be unrelated to one another. However, in the present invention, as will be explained below, they are linked together and a logical story is created in a manner to be described by combining four scenarios without any sense of incompatibility.

Below, the above scenarios, that is, the abduction scenario, curse scenario, illness scenario, guarded escort scenario, mission scenario, subjugation scenario, two search scenarios, escape scenario, and information scenario, are often called in more general terms as the first to tenth partial scenarios (1) to (10) in the instant specification.

Different end conditions E1 through E10 are prepared or defined for each of the partial scenarios. Except for end conditions E6, E7, and E8 defined for the subjugation scenario and the first and second search scenarios (6), (7), and (8) and end conditions E9 and E10 defined for the escape and information scenarios (9) and (10), two different end conditions (hereinafter referred to as end conditions A and B) are provided as the end conditions for the partial scenarios(1) through (5). Here, end condition A specifies the end condition used when any other result than the essential aim of each partial scenarios can not be accomplished while the end condition B specifies the end condition used when the aim of each partial scenario is achieved.

The end condition A, occurs, for example in the abduction scenario, when the main character in the game overthrows the abductor. On the other hand, the end condition B occurs when the person who was abducted is rescued without any mishap and talks to the party who requested their release. When the rescue attempt fails and the abducted person dies, the abduction scenario ends. The end conditions A and B for the above abduction scenario also vary according to each aim or purpose of the abduction. For example, the end conditions A and B may be prepared for the abductions for a ritual, for materialistic desires, for monopoly, or for obstructing a coronation. The following scenarios are also prepared which correspond to the different end conditions A and B and which can be reasonably linked to the end conditions A and B.

The following linked scenarios are determined by a four-byte pseudo-random number. A number of partial ending events are prepared as possibilities for the next partial scenario. Specifically, even when the end condition for a ritual abduction comes to the end condition A, various events occurs such that the abductor escapes together with the abducted person (event 1), that the abductor puts a spell on the abducted person (event 2), that the abductor loses the abducted person (event 3), that the abductor loses the entire party including the abducted person (event 4), that the abductor kills the abducted person (event 5), and that the abducted person is an impostor (event 6).

In a role playing game relating to the present invention, the partial scenario to be linked next is established according to the events 1 through 6. For example, in the case of event 1, the information scenario or abduction scenario is established as the next partial scenario, or in the case of event 2, the curse or information scenario is set up as the next scenario. Likewise, partial ending events are also prepared for other events.

Likewise, when a ritual abduction ends with end condition B, the next scenario is determined independently of the previous abduction scenario. Alternatively, if an event such as reappearance or revival of the abductor occurs, the next scenario will be selected from the information scenario, subjugation scenario, first search, or second search scenario.

Below, the next following scenarios for the abductions based on materialistic desires or monopolistic desires are also prepared in the same way.

Also, in the curse scenario, the end condition A occurs when the main character moves to the place where an object necessary for removing the curse is located, while the end condition B appears when the main character removes a cause for the curse and talks to the requesting party. End condition B might also appear when the main character loses the means of removing the cause of the curse, that is, when he or she has failed. Furthermore, these end conditions A and B and failure conditions differ from one another in dependence upon the conditions for removing the curse. Specifically, provision is made about information and first and second search scenarios for each of the end condition A and B and for the failure condition.

In the illness scenario, the end condition A is caused to occur when the main character goes to the place where a curing object is present and the end condition B appears when the main character removes the cause of the illness and talks to the requesting party. Also, end condition B defines the failure condition that appears when the means of curing the illness is lost. In the illness scenario, end conditions and the following linked partial scenarios differ from one another, depending upon the reason for the illness.

In the guarded escort scenario, end condition A appears when the main character arrives at a target place, and the failure condition appears when the person escorted is killed. End condition B may be caused to occur when the person being escorted talks to the requesting party after they have been escorted and may appear as the failure condition when the person escorted is killed. When either end condition A or B is fulfilled for the guarded escort scenario, the next partial scenario is determined randomly, namely, by a random number.

Furthermore, in the mission scenario, the end condition A occurs when an item is handed over to a target person and the failure condition occurs when the item is lost or is not handed over. End condition B may occur when the item is handed over and the main character talks to the requesting party and the failure condition appears when the item is lost or not handed over. As with the guarded escort scenario, when either end condition A or B is fulfilled in the mission scenario, the next partial scenario is determined randomly, namely, by a random number generated in the game system.

Next, in the subjugation scenario, the end condition is when a target is subdued and the main character talks to the requesting party. In the first search scenario for searching for an item, the end condition occurs when the item is found and handed over to the requesting party. The failure condition appears when the item is lost or not handed over. In the second search scenario for searching for a person, the end condition occurs when the person is found and taken to meet the requesting party while the failure condition occurs when the person being searched dies. When any end or failure condition for these three scenarios is fulfilled, the next partial scenario is determined as for the guarded escort and mission scenarios.

Also, in the escape scenario, the end condition occurs when the main character moves to the next area and in the information scenario, the end condition appears when the main character goes to the next area and obtains information. In the escape scenario, when the end condition is fulfilled by movement of the main character into another area, the next partial scenario is determined randomly, namely, by a random number. However, when information is obtained through the information scenario, the next partial scenario is executed before the information scenario. The relationship between this and the partial scenario in which the information was requested is used to determine the next partial scenario.

As explained above, in the role playing games of the present invention, the partial programs from the first stage to the fourth stage are determined randomly and so the number of combined partial scenarios enable users to enjoy games with different storylines. This enables the creation of role playing games of which players will not tire.

In this example, as explained below, a sequence of pseudo-random numbers is used to successively determine the scenarios from the first stage partial scenario through to the fourth stage partial scenario. Normally, when a first one of the pseudo-random number sequence or string (hereinafter referred to as a random number seed) is produced in each computer, only one random number sequence or string is uniquely determined after generation of the random number seed. Therefore, each partial scenario selected by the random number produced after the same random number seed will be uniquely determined by the random number sequence. However, as explained above, the actual pseudo-random number seed itself is four bytes long. Therefore, even if the same random number seed is used or selected in the game by a player, each story seems to be configured at random by the scenarios that are linked in a substantial random manner, as long as that all of the random number seeds are not memorized by the player in question.

An overview of the game program production method will be described in connection with a first aspect of the present invention. In this method, games with various storylines are created by combining partial scenarios selected from the first to tenth partial scenarios (1) through (10) into four stages 1 to 4. Under the circumstances, decision is made at first about the first partial scenario (actually the program for the partial scenario (simply called the partial scenario below to simplify explanation)) of the story and the second partial scenario which follows the first partial scenario, depending on the end condition of the first partial scenario. At any rate, the first and the second partial scenarios are selected from the partial scenarios mentioned above.

In this event, the end condition for the first partial scenario used in the first stage and the start condition of the second partial scenario in the second stage are made up so that the story is reasonably continued between the first and the second partial scenarios.

More specifically, the first partial scenario or the partial scenario of the first stage is selected and determined from the above-mentioned partial scenarios 1 through 8 by using pseudo-random numbers. Also, the number of end conditions for the partial scenario of the first stage are prepared to fit the processing results of the first stage partial scenario. As a result, one of the above partial scenarios 1 through 10 can be used as the second stage partial scenario. The partial scenario that makes up the fourth stage is selected from the partial scenarios equipped with the one end condition that is prescribed by parameters in accordance with the results of the processing of the fourth partial scenario. For example, in the method according to the present invention, the program has been written or produced to allow any one of the subjugation scenario and the first and the second search scenarios to be used as the partial scenario in the fourth stage. Thus, the partial scenario in the third stage is selected from the partial scenarios equipped with an end condition that matches the start condition of the above fourth stage partial scenario.

In the method for producing the game programs according to the present invention, the level of difficulty can be varied by combinations of programs for partial scenarios that prescribe the story in accordance with the results of processing the story. As mentioned before, the story is configured by the partial scenarios from the first stage through to the fourth one. Furthermore, programs for role playing games according to the present invention are produced or written so that the end condition can be ultimately reached by successively clearing each of the partial scenarios.

Figure 3:
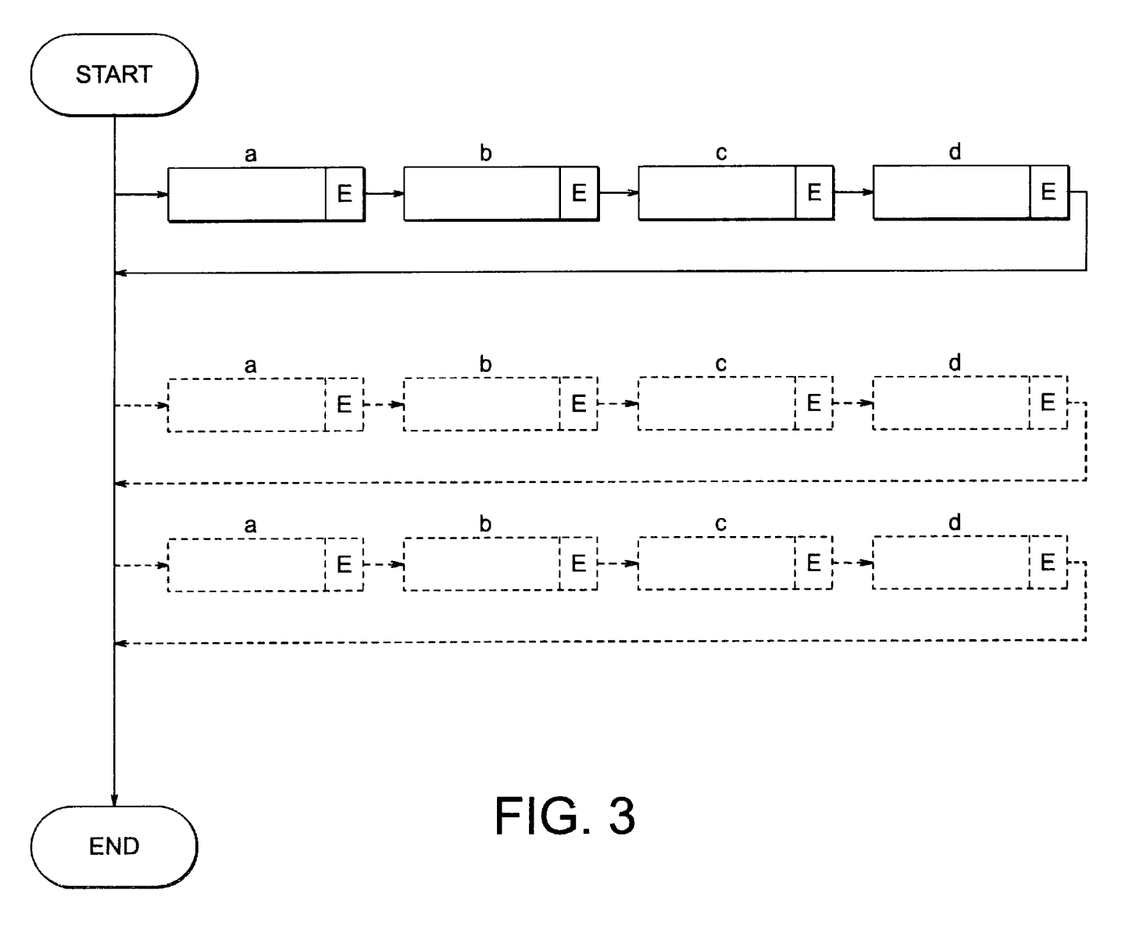
FIG. 3 shows the flow of a game produced using the method for producing games that relates to the present invention.

Referring to FIG. 3, description will be schematically made about the role playing games that use the game programs according to the present invention produced by using the above method. In the games in question, players can enjoy partial games which have many and various story lines as explained above from the start of the games to the final end. In FIG. 3, the configuration of just one story is shown by a solid line. However, in actual fact, partial games equipped with many storylines are provided from the start to the end as shown by the broken lines. One long playing storyline is configured by these many stories.

Firstly, the story that will be selected is either substantially randomly determined at the start of the role playing game by the use the pseudo-random numbers or can be determined when the player inputs a number given in the story.

As shown in FIG. 3, each story is composed of first stage partial scenario a, second stage partial scenario b, third stage partial scenario c, and fourth stage partial scenario d, as mentioned in conjunction with the method for producing game programs relating to the present invention. Furthermore, one of the first to eight partial scenarios (1) through (8) is randomly selected as the first stage partial scenario a from the first to tenth partial scenarios. The second stage scenario b is selected according to the end condition E of the first stage partial scenario a. One of the first to tenth partial scenarios (1) through (10) may be selected as the second stage partial scenario b in accordance with the end condition E of the first stage partial scenario a and/or a random number.

As explained before, the end condition of the partial scenario (1) through (8) used as the first stage partial scenario a is selected from end conditions A and B and failure conditions selected by the random number. As a result, one scenario from the first to the tenth partial scenarios (1) through (10) is selected as the second stage partial scenario b.

Next, the third stage partial scenario c is determined using random numbers from the end condition of second stage partial scenario b. To ensure selection of the third stage partial scenario c that links to the fourth stage partial scenario d as described above, the partial scenarios correspond to random numbers. That is, a partial scenario equipped with an end condition E that leads on from either the subjugation scenario or the first and the second search scenarios is selected as the third stage partial scenario c.

Following this third stage partial scenario c, the fourth stage partial scenario d is selected from the subjugation scenario and the first and the second search scenarios in accordance with the results of the processing of the third stage scenario c. The player can proceed in the game along the lines of the selected partial scenario.

Thus, because the number of storylines increases according to the number of ways in which the ten types of partial scenarios are combined into four stages, players can enjoy a game with a number of different stories. The single story configured by the four partial scenarios is not so long and thus, the player, for each story, not only feels the satisfaction on completion of the game but also is able to enjoy a different story when they next play the game. This enables players to maintain their interest for a long time.

Figure 4:
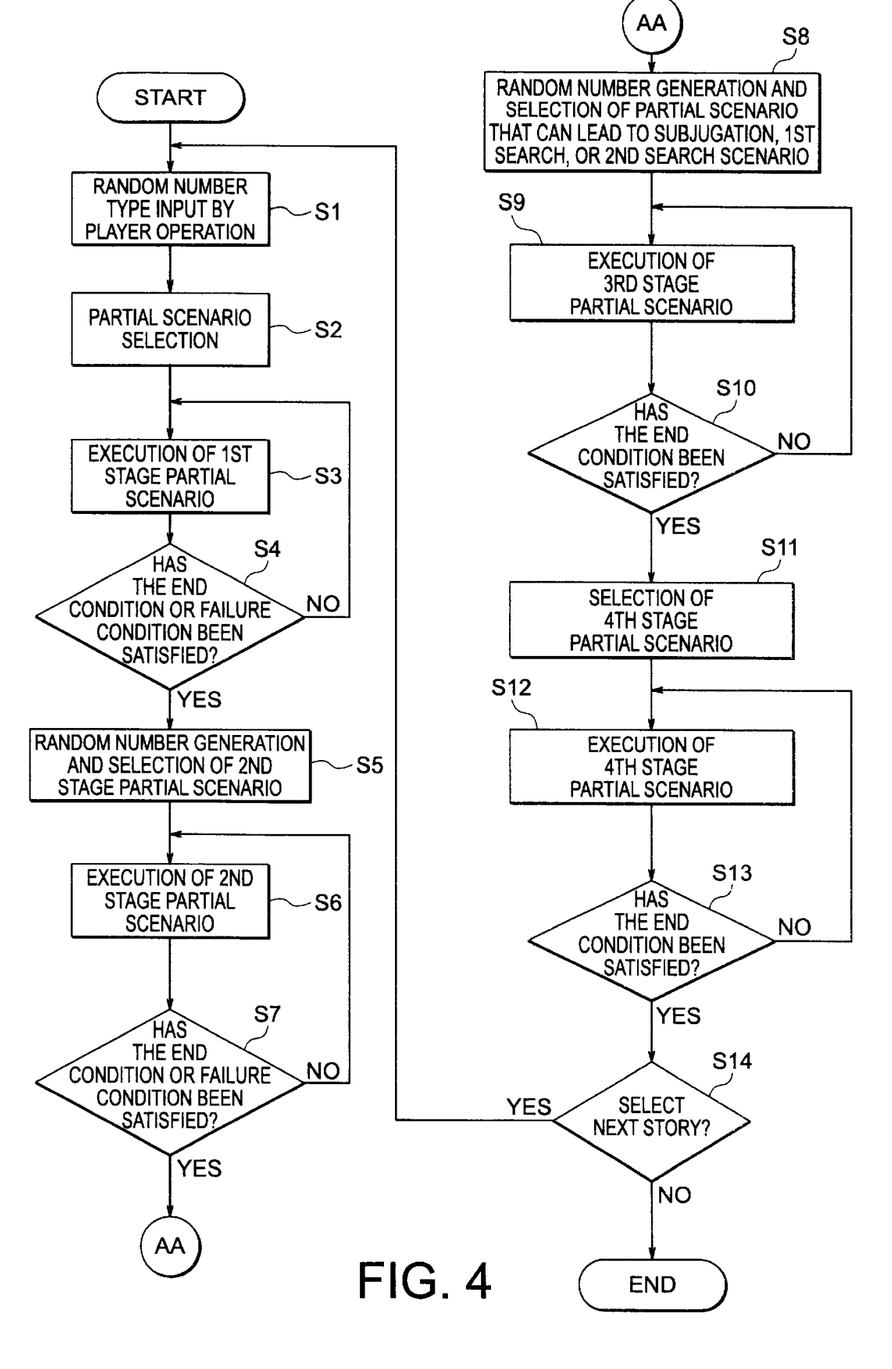
FIG. 4 is a flowchart for explaining the operation of a game system that relates to an aspect of the embodiment of the present invention.

Next, execution of a role playing game relating to the present invention with just a single story will be explained with reference to FIG. 4 and FIG. 1. Firstly, prior to the start of the role playing game, the recording medium 84, in which the program for the role playing game is stored, is loaded into the recording medium driver 81 (FIG. 1). When the player operates the controller 11 in this state, at least part of the program in the recording medium 84 is given to the main memory 53 via the main bus MB under control of the OSROM 54 and CPU 51. In this example, it is assumed that a program composed of the partial scenarios 1 through 10 is given to the main memory 53.

Next, a pseudo-random number seed that corresponds to the story number is input by a player operation or a pseudo-random number seed is input in accordance with the operation timing of the player (Step S1). Here, four-byte random number seeds have been prepared. When a random number seed is input, the CPU 51 selects the partial scenario that corresponds to the random number seed (Step S2), and images relating to that partial scenario are displayed on the display device 65 via the graphic control unit 60. After this operation, the first stage partial scenario is executed in accordance with a command input when a player operates the controller 11 (Step S3).

In step S4, decision is made about whether or not end condition A or B or the failure condition is fulfilled in the first stage partial scenario. As long as the above-mentioned condition is not fulfilled, the first stage partial scenario is executed. Herein, it is to be noted that judgement is not always made in connection with both end conditions A and B and that judgement might be made during the game in connection with either one of the end conditions selected at certain timing. Thus, one end condition is selected and at such point during the game. As a result, decision may be made about whether or not the selected end condition is fulfilled. In step S4, when either one of the end condition A or B or the failure condition for the first stage partial scenario is satisfied, the next pseudo-random number (second pseudo-random number) is generated by the CPU 51. The partial scenario that corresponds to the second pseudo-random number is selected as the second stage partial scenario (step S5).

When the second stage partial scenario is selected, the partial scenario is executed (step S6). In step S7, judgement is made about whether or not the end condition A or B or the failure condition for the second stage scenario is satisfied.

Next, in step S8, a the third stage partial scenario that corresponds to a third pseudo-random number generated is selected. Here in actual fact, the third stage partial scenario that corresponds to the pseudo-random number is read from the main memory 53 and executed on the basis of an indication given from a player. A partial scenario that can lead onto either a subjugation scenario or first or second search scenario in the fourth stage partial scenario is selected as the third stage partial scenario. Here, by limiting the partial scenarios that correspond to the third pseudo-random number generated in step S8, a third stage partial scenario that links to the above fourth stage partial scenario can be selected.

Following the above-operation, step S10 is executed to determine whether or not the end condition A or B or the failure condition for the third stage partial scenario is fulfilled. As long as neither end condition A or B nor the failure condition is fulfilled, the third stage partial scenario will be executed. In step S10, when either of the above end conditions or failure condition is fulfilled, the fourth pseudo-random number is generated by the CPU 51 and the fourth stage partial scenario is selected (step S11). As above, the fourth stage partial scenario can be either the subjugation scenario or the first or second search scenario. The partial scenario is executed in step S12 based on CPU 51 control. In step S13, the CPU 51 determines whether or not the end condition for the fourth stage partial scenario is fulfilled. When it is determined that the end condition for the fourth stage is fulfilled, the processing proceeds to step S14.

In step S14, judgement is made about whether or not the player selects the next story. In step S14, when the next story is selected, processing returns to step S1 and the same operations are repeated. When the next story is determined by a pseudo-random number, it is possible to adjust the pseudo-random number generation so that a different story from the previous one is selected. Also, game results are stored in the memory card device 20, which is attached to the operation control part 90, and these results can be used when later games are played.

On the other hand, when the player does not select the next story in step S14, the story that is configured by the first to fourth stage partial scenarios comes to an end.

Figure 5:
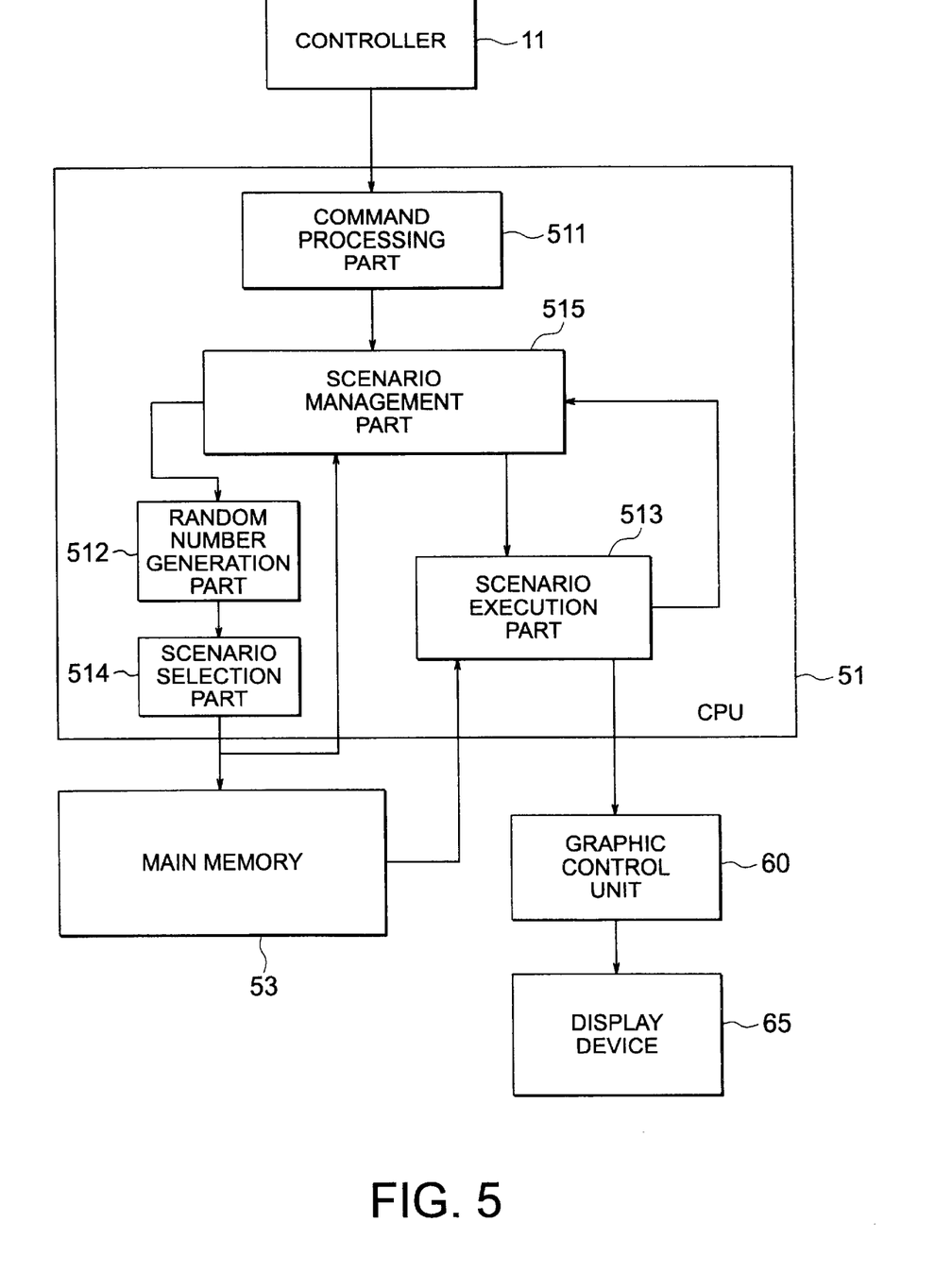
FIG. 5 is a block diagram for explaining a game system that relates to an aspect of the embodiment of the present invention.

The CPU 51 control operations that relate to the present invention will now be explained more detail with reference to FIG. 5 and FIG. 1. In FIG. 5, for brevity of description, the controller 11, main memory 53, graphic control unit 60, and display device 65 are shown in addition to the CPU 51. As shown in the figure, the CPU 51 comprises a command processing part 511 that processes commands from the controller 11, a random number generation part 512, a scenario execution part 513, a scenario selection part 514, and a scenario management part 515. Here, the random number generation part 511, the scenario execution part 514, the scenario selection part 514, and the scenario management part 515 may, as a group, be called the scenario processing part.

When a command is entered by a player operation, the command processing part 511 firstly operates the scenario management part 515 and then causes the random number generation part 512 to generate a pseudo-random number seed. Here, when a player directly enters a pseudo-random number corresponding to the story by operating the controller 11, pseudo-random number strings may be generated sequentially. In this event, this pseudo-random number seed is included in the pseudo-random strings as the default value for the random number generation part 512. In the scenario selection part 514, the pseudo-random number seed generated by the random number generation part 512 is converted into a partial scenario address stored in the main memory 53 and this address is sent to main memory 53.

As a result, commands and data corresponding to the partial scenario are read sequentially from the main memory 53 address that corresponds to the pseudo-random number seed and sent to the scenario execution part 513. The scenario execution part 513 is operated according to instructions and data from the main memory 53 and according to commands from the player given via the command processing part 511 and the scenario management part 515. The results of these operations are displayed on the display device 65 via the graphic control unit 60. In addition to this display, it is also possible to output audio through the audio control part 70. Also, the results of the execution of the scenario execution part 513 and the results of the partial scenario selection in the scenario selection part 514 are sent to the scenario management part 515. In the scenario management part 515, the partial scenario being executed is detected from the selection results of the scenario selection part 514 and the end conditions for the partial scenario are monitored. The random number generation part 512 is accessed to execute the partial scenario to be next selected and the next pseudo-random number is sent to the scenario selection part 514. When the next pseudo-random number is read from the random number generation part 512, the scenario selection part 514 converts the pseudo-random into a main memory 53 address. The next partial scenario is then read and executed in the scenario execution part 513.

In the example shown in the figure, the results of processing in the scenario execution part 513 are then monitored. The end of the partial scenario is detected in the scenario management part 515, by detecting whether or not the end condition for the partial scenario is fulfilled. On detection of the end condition, the partial scenario to be next executed is determined by the pseudo-random number generated in the random number generation part 512. Judgement is made about whether or not conversations, voice pieces, or the like are to be inserted to move to the next scenario and this enables a smooth transition to the next partial scenario.

Specifically, on moving from the previously executed partial scenario to the next partial scenario, it is assumed that the end condition A or B is executed as a result of accomplishing the aim of the previously executed partial scenario. In this event, the player may wrongly feel that the game is completed or finished. In consideration of the above, when the previous partial scenario is finished and the end condition as described above is generated in the scenario management part 515, a conversation of another character in the story praising the actions of the main character will be inserted in the abduction scenario. Also, in the curse scenario, illness scenario, guarded escort scenario, mission scenario, subjugation scenario, and first and second search scenarios, when the end condition B is executed as a result of player operations and these scenarios are not the fourth stage partial scenario, the scenario management part 515 will anticipate the movements of the main character and another person or the requesting party will again, through pictures or sound, convey a different aim to the main character by inserting an additional conversation piece.

Below, similar operations are successively executed from the first stage partial scenario through to the fourth stage partial scenario. Thus in the present invention, pseudo-random numbers are used to select partial scenarios thus enabling players to enjoy role playing games in which various partial scenarios are combined to provide a wide variety. When the random-number seed is the same for pseudo-random numbers, the same random number strings are produced. Therefore, another player using the same random number seed and doing the same operations as the original player will play a game with the same story as the original player.

Figure 6:
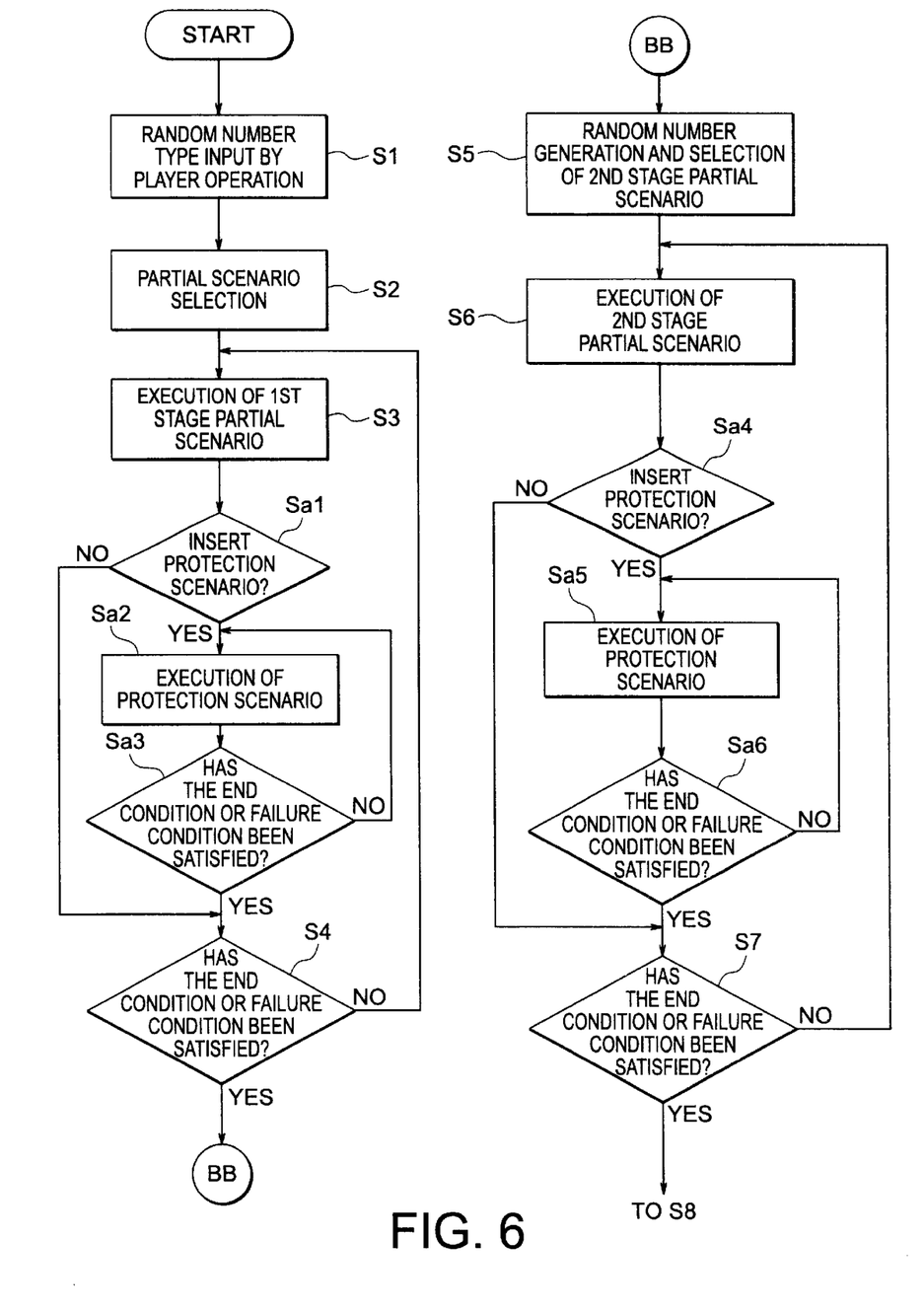
FIG. 6 is a flowchart for explaining the operation of a game system that relates to another aspect of the embodiment of the present invention.

Next, operation of the game system relating to another aspect of the embodiment of the present invention will be explained with reference to FIG. 6. As is clear from FIG. 6, this aspect of the embodiment differs from the aspect of the embodiment shown in FIG. 4, in that a protection scenario is inserted to prevent the main character from approaching a specific place or item during execution of the first stage partial scenario (step S3) and during execution of the second stage partial scenario (step S6). However, other parts are the same as in FIG. 4 and therefore, in FIG. 6, explanation of the processing relating to the third and fourth stage partial scenarios is omitted.

A more specific explanation will now be given. In the example shown in the figure, in step S3 during execution of the first stage partial scenario, judgement is made about whether or not a protection scenario is inserted (step Sa1). When a protection scenario is inserted (step Sa1: Yes), decision is made about whether or not the end condition or failure condition for the protection scenario is fulfilled (step Sa3) after the protection scenario is executed in step Sa2. As with the partial scenario, the protection scenario also has an end condition and failure condition. When it is determined that the protection scenario has failed or ended, decision is made about whether or not the end condition for the first stage partial scenario is fulfilled (step S4). Here, failure of the protection scenario is treated as failure of the partial scenario.

Likewise, in the illustrated example, a protection scenario may be inserted between the execution step S6 of the second stage partial scenario and the end condition determination step S7 for that partial scenario. As a result, steps Sa4, Sa5, and Sa6 are also inserted between the steps S6 and S7 to determine whether or not a protection scenario exists, to execute the protection scenario and to determine the end of the protection scenario, respectively.

Thus, insertion of the protection scenario enables even greater player interest by creating more complex story plots where the main character is made to search for items that will destroy a barrier in order to enter a target place, for example a cave. Also, a protection program can be selectively inserted according to the level of difficulty of the game selected by the player. It is also possible for the end condition or failure condition for the protection program to be treated in the same way as the end condition or failure condition of each partial program.

While the present invention has far been described in conjunction with a few embodiments thereof, it will be readily possible for those skilled in the art to put the present invention into practice in various other manners. For example, the above explains only those matters that apply to the game device shown in FIG. 1. However, the present invention is not limited to the game device of FIG. 1 but can be applied to other home game machines, mobile game devices, or work game devices. Also, the present invention is not limited simply to game devices but can also be used in games used on computers and workstations.

As explained above, the present invention can be used to produce a method for producing games that are rich in variety and that can sustain player interest over a long period, a game system, and a recording medium.

What is claimed is:

1. A method of producing a game program that executes a game in accordance with a story divisible into a first plurality of stages, said first plurality being a predetermined number, comprising the steps of:

storing a plurality of partial programs which define a second plurality of partial scenarios, the number of said second plurality of shoos being greater than the predetermined number of the stages in said first plurality, each of said partial scenarios having at least one end condition; and successively selecting the stored partial programs to assign each selected partial program to each of the predetermined number of the stages with reference to the end condition of each selected partial program and to thereby combine the partial programs to make up the story, wherein the predetermined number of the stages is equal to four and the story is made up by successively combining partial programs selected in third and fourth stages with partial programs selected in first and second stages after execution of a second partial program.

2. The method according to claim 1, wherein each selected partial program in each stage is randomly determined from among the plurality of the partial programs.

3. The method according to claim 1, wherein a leading scenario defined by a leading partial program assigned to a leading one of the stages has an end condition determined by an ending event occurring in accordance with results from processing the leading partial program.

4. The method according to claim 1, wherein the predetermined number of the stages is equal to four and the partial programs are equal in number to ten.

5. A game system capable of executing a game in accordance with a player operations and a story divisible into a first plurality of stages, said first plurality being a predetermined number, comprising:

storage means for storing a plurality of partial programs which define a second plurality of partial scenarios, said second plurality being greater in number than the predetermined number of the stages, each of said partial scenarios having at least one end condition;

scenario processing means, operable in response to the player operations, for successively selecting the stored partial programs to assign each selected partial program to each of the predetermined number of the stages with reference to the end condition of each selected partial program and to thereby combine the partial programs to make up the story, wherein the predetermined number of the stages is equal to four and the story is made up by successively combining partial programs selected in third and fourth stages with partial programs selected in first and second stages after execution of a second partial program.

6. The game system according to claim 5, wherein the scenario processing means comprises:

management means for managing the partial programs for partial scenarios;

pseudo-random number generation means for generating pseudo-random number strings under control of the management means;

selecting means for successively selecting the partial programs to successively assign each partial program to each stage in accordance with the pseudo-random number strings; and scenario execution means for successively executing, in each of the stages, the partial programs selected by the selecting means and read out of the storage means to combine the partial programs and to make up the story.

7. A computer-readable red medium for use in executing a game according to player operations and a story divisible into a first plurality of stages, said first plurality being a predetermined number, the computer-readable recording medium being operable in accordance with a program that is executed by a computer and that comprises the steps of:

storing a plurality of partial programs which define a second plurality of partial scenarios and which are greater in number than the predetermined number of the stages, each of said partial scenarios having at least one end condition; and successively selecting the stored partial programs to assign each selected partial program to each of the predetermined number of the stages with reference to the end condition of each selected partial program and to thereby combine the partial programs to make up the story, wherein the predetermined number of the stages is equal to four and the story is made up by successively combining partial programs selected in third and fourth stages with partial programs selected in first and second stages after execution of a second partial program.

8. The method according to claim 7, wherein each selected partial program in each stage is randomly determined from among the plurality of the partial programs.

9. The method according to claim 7, wherein a leading scenario defined by a leading partial program assigned to a leading one of the stages has an end condition determined by an ending event occurring in accordance with results from processing the leading partial program.

10. The method according to claim 7, wherein the predetermined number of the stages is equal to four and the story is made up by successively combining the partial programs selected in third and fourth stages with the partial programs selected in first and second stages after execution of the second partial program.

11. The method according to claim 7, wherein the predetermined number of the stages is equal to four and the partial programs are equal in number to ten.

* * * * *